United States Patent [19]

Tanaka

[11] Patent Number: 4,743,978

[45] Date of Patent: May 10, 1988

[54] RECORDING/REPRODUCTION SYSTEM WITH A FINE PICTURE QUALITY FOR A HELICAL SCAN-TYPE VIDEO TAPE RECORDER

[75] Inventor: Shigeo Tanaka, Kawasaki, Japan

[73] Assignee: Kabushiki Kaisha Toshiba, Kawasaki, Japan

[21] Appl. No.: 939,886

[22] Filed: Dec. 9, 1986

[30] Foreign Application Priority Data

Dec. 10, 1985 [JP] Japan .................................. 60-275914

[51] Int. Cl.$^4$ ...................... H04N 9/80; H04N 5/782; G11B 5/02
[52] U.S. Cl. ..................................... 358/310; 358/343
[58] Field of Search ............... 358/310, 330, 335, 341, 358/343; 360/18-21, 61, 64

[56] References Cited

U.S. PATENT DOCUMENTS

| | | | |
|---|---|---|---|
| 4,376,957 | 3/1983 | Dischert et al. ................ | 358/310 X |
| 4,591,924 | 5/1986 | Miura et al. ......................... | 358/330 |
| 4,672,467 | 6/1987 | Heitmann ......................... | 358/310 X |

OTHER PUBLICATIONS

IEC Secretariat Document No. SC60B (S) 118 Professional Recording Format on BETA Cassettes (Type L).
IEC Secretariat Document SC 60B(s) 119 Professional Recording Format on VHS cassettes (Type M).
German periodical Fernseh-Und Kino-Technik, vol. 38, No. 12/1984, pp. 523 to 532.

Primary Examiner—W. B. Perkey
Attorney, Agent, or Firm—Cushman, Darby & Cushman

[57] ABSTRACT

In the video tape recorder capable of providing a recording and reproduction with high picture quality, first and second heads of a first azimuth angle and for recording and reproducing the luminance signal is disposed on the rotary head cylinder. Third and fourth heads of a second azimuth angle different from the first azimuth angle, and for recording and reproducing the color signal is disposed adjacent to the first and second heads on the rotatry head cylinder, respectively. The second and fourth heads are disposed at a position separate, by a distance corresponding to the period of integer times one horizontal scanning period of the recorded video signal, from the position on the rotary head cylinder rotated 180° from that of the first and third heads, respectively. A fifth head with the second azimuth angle is disposed at a positon rotated 180° from that of the first head. High image quality recording and reproduction can be performed by using the first to fourth heads. The first and fifth heads reproduces the video information as recorded on the video tape in the format which is employed for the current home use VTR, and in which the frequency-modulated luminance signal and the low-frequency converted color sub-carrier signal are superposed and recorded in one track.

47 Claims, 5 Drawing Sheets

RECORDING/REPRODUCTION SYSTEM WITH A FINE PICTURE QUALITY FOR A HELICAL SCAN-TYPE VIDEO TAPE RECORDER

BACKGROUND OF THE INVENTION

This invention relates to a recording/reproduction system with a fine picture quality for a helical scan-type video tape recorder (VTR), and more particularly to the recording/reproduction system which is adaptable for a recording format used in home-use VTR.

Two-head helical scan type VTRs have widely been employed in home use VTRs. In the recent VTRs, the track pitch is narrowed, to allow a long time record and reproduction of the video information. For improvement of the picture quality, the high band system is realized, and for improvement of sound quality, the recording system in which the sound signal is frequency modulated and superposed on the video signal is realized.

However, the picture quality of the home-use VTR is still unsatisfactory when compared with that of the off the air TV picture. This is due to the facts that the band width is unsatisfactorily wide, and S/N performance is unsatisfactory. In the currently employed color signal recording system, the color subcarrier which is called color-under is converted into carriers of low frequencies before recording. In this recording system, the color signal is inevitably phase varied due to the time base error, so that the color irregularity occurs and S/N is unsatisfactory. Therefore, it is considered that when this type of recording system is used, there is a limit for improvement to the picture quality. Recently, video disks prevails, and the market needs production of the home-use VTRs with high picture quality. Therefore, there is a strong demand for development of the color signal recording system with high picture quality.

There has been developed the broadcasting VTRs requiring high picture quality, in which the video tape having a ½ inch width (cassette), widely used by home-use VTRs, can be used for recording the video signal. To satisfy the broadcasting performances, this recording system employs the video signal recording system, which is different from that of home-use VTRs. Specifically, the luminance signal (Y) and the color signal (C), which are contained in the video signal, are separated from each other. The color signal is time-compressed before recorded in the tracks provided exclusively for it. This recording system can effectively improve picture quality, but it is not compatible with the home-use VTRs currently used because these are under different rules. For these reasons, there are strong demands for the VTRs based on new recording systems, which are adaptable for the current recording format widely used by home use VTRs.

SUMMARY OF THE INVENTION

Accordingly, an object of this invention is to provide a recording/reproduction system with a fine picture quality for a helical scan-type video tape recorder (VTR) which is adaptable for the recording format used by the current home-use VTRs.

According to this invention, there is provided a recording/reproduction system with a fine picture quality for a helical scan-type video tape recorder, comprising:

select means for selecting a recording mode or a reproduction mode;

a video signal supply source for supplying a composite video signal;

mode select means for selecting a first mode or a second mode, the first mode being provided for recording the video signal in a first recording format in which a luminance signal component and a color signal component of the video signal are recorded in different tracks, the second mode being provided for recording the video signal in a second recording format in which the frequency-modulated luminance signal and the low-frequency converted color sub-carrier signal are superposed and recorded into a single track;

first signal processing means for separating, in the first mode, the luminance signal component from the supplied composite video signal, and producing the separated luminance signal component;

second signal processing means for separating, in the first mode, the color signal component from the supplied video signal, and producing the separated color signal component;

third signal processing means for separating, in the second mode, the color sub-carrier signal and the frequency-modulated luminance signal from the supplied composite video signal, for converting the separated color sub-carrier signal into low frequencies, for superposing the separated, low-frequency converted color sub-carrier signal on the separated frequency-modulated luminance signal, and for producing the superposed signal;

a rotary head cylinder around which a video tape is wound in the recording mode or reproduction mode;

first and second heads of a first azimuth angle, which are disposed on the rotary head cylinder;

third and fourth heads of a second azimuth angle different from the first azimuth angle, which are disposed on the rotary head cylinder;

a fifth head disposed on the rotary head cylinder at the position rotated 180° from the first head, and having the second azimuth angle different from that of the first head;

means for selectively supplying the signals supplied from the first to third signal processing means to the first to fifth heads according to the first and second modes in a record mode, the selectively supplying means supplying, when the first mode is selected, the output signal of either the first or the second signal processing means to the first and second heads, while at the same time supplying to the third and fourth heads the output signal of either the first or the second signal processing means, which is different from that supplied to the first and second heads, and the selectively supplying means supplying, when the second mode is selected, the output signal from the third signal processing means to the first and fifth heads;

means for selectively outputting signals supplied from the first to fifth heads according to the first and second modes in a reproduction mode, the selectively outputting means outputting, when the first mode is selected, the output signals are alternately output from the first and second heads, as a first signal, while at the same time outputting the output signals which are alternately output from the third and fourth heads, as a second signal, and the selectively supplying means supplying, when the second mode is selected, the output signals which are alternately output from the first and fifth heads, as a third signal;

fourth signal processing means which receives the first and second signals, superposes them, and outputs the superposed signal as a video signal; and fifth signal processing means which receives the third signal, separates a luminance signal and a low-frequency converted color sub-carrier signal from the third signal, frequency-converts the separated low-frequency converted color sub-carrier signal, superposes the frequency-converted color sub-carrier signal to the separated luminance signal component, and outputs the superposed signal as a video signal.

DETAILED DESCRIPTION OF THE PREFERRED EMBODIMENTS

Figure 1A:
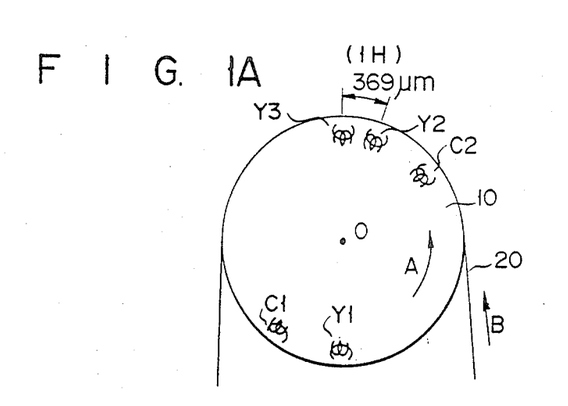
FIG. 1A shows a plan view illustrating an arrangement of heads in connection with a rotary cylinder head, which is employed in a recording/reproduction system with a fine picture quality for a helical scan-type video tape recorder (VTR), which is adaptable for the recording format used in currently used home use VTRs.

FIG. 1A shows a front view of the head portion of an embodiment of a recording/reproduction system with a fine picture quality for a helical scan-type video tape recorder (VTR), according to this invention. On rotary head cylinder 10 are mounted luminance signal recording/reproduction heads Y1 and Y2, color signal recording/reproduction heads C1 and C2, and head Y3 to be described later. Heads Y1 and Y2 have the same azimuth angle (for example $-6°$). Heads C1, C2 and Y3 have the same azimuth angle (for example, $+6°$), which differs from that of Y1 and Y2. The track width of heads Y1, Y2 and Y3 is about 27 $\mu$m and the track width of heads C1 and C2 is about 25 $\mu$m.

Figure 1B:
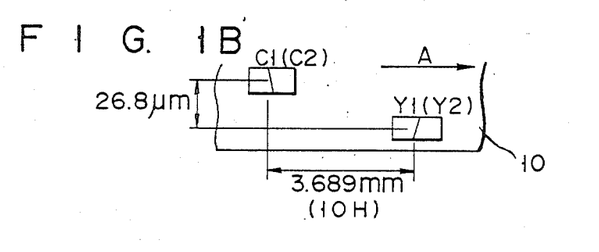
FIG. 1B shows a schematic side view partially illustrating the head arrangement shown in FIG. 1A.

For the reason to be described later, head Y2 is placed away from the position 180° rotated from head Y1 by the distance corresponding to the period of integer times one horizontal scanning period (H) of a video signal. In this embodiment, head Y2 is placed apart from the position rotated 180° from head Y1 in the direction opposite to that of arrow A, which is rotation direction of cylinder 10, by the distance (369 $\mu$m) corresponding to 1H of the video signal. Similarly, head C2 is placed apart from the position rotated 180° from head C1 by the same distance and in the same direction as in the case of Y2. Head Y3 is placed at the position rotated 180° from head Y1. As shown in the schematic side view of FIG. 1B, heads Y1 and C1 are placed apart from each other by the distance (3.689 mm) corresponding to ten Hs, and vertically apart from each other, or stepped, by a predetermined distance (26.8 $\mu$m as viewed from the center of the head). Similarly, heads Y2 and C2 are placed apart from each other by the distance (3.689 mm) corresponding to 10 Hs, and vertically apart from each other by a predetermined distance (26.8 $\mu$m as viewed from the center of the head). In FIGS. 1A and 1B, reference numeral 20 designates a tape. Tape 20 runs in the direction shown by arrow B.

When the video signal is recorded by using heads Y1, Y2, C1 and C2 thus arranged, luminance signal and color signal are separated from the video signal, and then they are supplied to the corresponding head, respectively, and recorded on tape 20. To be more precise, in the first step, luminance signal is supplied to head Y1, and color signal is supplied to head C1, and they are recorded simultaneously. In the second step, luminance signal is supplied to head Y2 and color signal is supplied to head C2, and the recording is performed. These steps are repeated alternately for recording.

Figure 2:
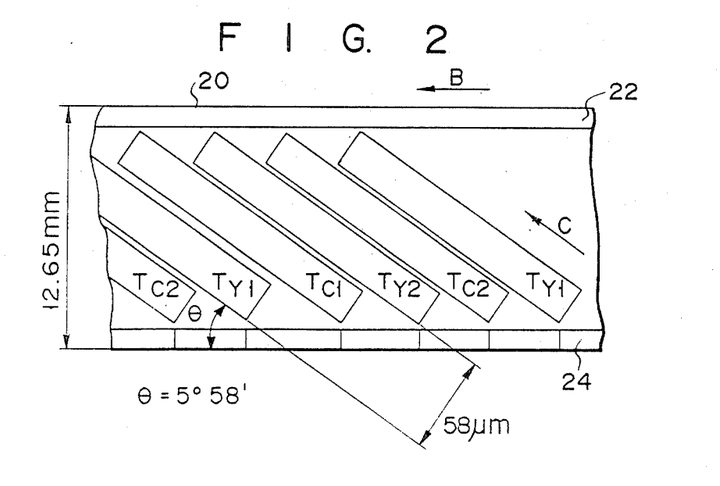
FIG. 2 shows a recording pattern on a video tape as obtained when the video signals are recorded by a recording/reproduction system with a fine picture quality for a helical scan-type VTR according to this invention.

A recording pattern on the tape after recording is done in the above manner, is shown in FIG. 2. As can be seen from the figure, luminance signal tracks and color signal tracks are alternately arranged. In the figure, the tracks formed by heads Y1, Y2, C1 and C2 are designated as $T_{Y1}$, $T_{Y2}$, $T_{C1}$ and $T_{C2}$, respectively. Tape 20 runs in the direction indicated by arrow B. Rotary head cylinder rotates in the direction indicated by arrow C. Reference numeral 22 designates an audio track, and 24 a control track. As recalled, luminance signal recording/reproduction heads Y1 and Y2, and color signal recording/reproduction heads C1 and C2 have different azimuth angles. This implies that, of the tracks $T_{Y1}$, $T_{C1}$, $T_{Y2}$, $T_{C2}$, $T_{Y1}$, . . . on tape 20, any two adjacent tracks are formed by heads having different azimuth angles. According to this recording system, cross talk is effectively prevented when the tape is played back.

As a format for the home use VTR currently marketed, there has been known the VHS format. To reproduce the video information as recorded in the video tape in the VHS format by using the VTR according to this invention, in the high quality picture recording, it is desirable for the track width for the luminance signal and that for the color signal to be set at about 27 $\mu$m and about 25 $\mu$m, respectively, in the two-hour mode (standard mode). Since the track pitch for the standard mode of the VHS system (two-hour recording time) is 58 $\mu$m, the track can be segmented into two parts; one for recording the luminance signal, the other for the color signal. In this case, an unrecorded portion (guard band) exists between these segmented tracks.

The video information, which is recorded in the video tape with the standard mode of the conventional VHS system, by the VTR manufactured according to this invention, can be reproduced by using heads Y1 and Y3 which have different azimuth angles and oppositely disposed, as the usual video head, and by appropriately processing the picked up signals.

In the case of the recording with a VHS 6-hour mode (three-time mode), the tape speed is one-third the normal speed, and the track pitch is 19 μm. Accordingly, in this case, not the high picture quality recording, but the usual recording is performed in the conventional manner, by using heads Y1 and Y3. Since the track width of heads Y1 and Y3 is about 27 μm, as described earlier, the VHS three-time mode recording is correctly executed with the overlapping record. The tape is exactly the same as that recorded by the three-times mode recording system by the VHS VTR. Therefore, the conventional VTR can be used for the reproduction for this tape in 6-hour mode. If heads Y1 and Y3 are used, the video tape bearing the information as recorded by the three-times mode recording and by using the conventional VHS VTR, can be reproduced.

To realize the recording of high picture quality, it is necessary for heads Y1 and Y2, and C1 and C2 to be disposed so as to satisfy the following requirements (1) and (2).

(1) Head Y2 is placed apart from the position rotated 180° from head Y1 by the distance corresponding to the period integer times one horizontal scanning period H (in this embodiment, 1H). Head C2 is also placed away from the position rotated 180° from head C1 by the distance corresponding to the period of integer times 1H (in this embodiment, 1H).

(2) Pairs of the adjacent heads for luminance and color signals (Y1 and C1, and Y2 and C2) can be arranged in various ways, if these pairs can record the video signals in the tape in the record pattern shown in FIG. 2. The paired heads are disposed separated by a distance corresponding to the period of integer times 1H, allowing for the correlation between the adjacent recording tracks on the tape. In this embodiment, the distance of both the heads was set to be 10H, because there is a physical limit and an electrical interference must be avoided.

As described above, the heads Y2 and C2 are respectively placed away from the position rotated 180° from heads Y1 and C1, by the distance corresponding to the period of integer times 1H. The reason for this will be given below. In the tape format by the recording of high picture quality, 1H is used for aligning the horizontal scanning periods on the tape. If the distance is set to be integer times 1H, an exact H alignment of the record signal on the tape can be obtained. Another reason is that the heads separated from each other by a distance of integer times 1H can be used for the double azimuth head for special reproduction in the VHS VTR. In other words, there is no need for another specially designed head for such purpose. In this case it is preferable for that distance to be as short as possible. The reason for this is that the shortest distance requires a lessened overlapped portion of tape 20 when it is wound around rotary head cylinder 10, less manufacturing difficulty to secure the precise positioning of the heads, and little jitter due to the disturbance by tape 20 and the heads. As recalled, the luminance signal heads and the color signal heads are vertically stepped. The height of this step is definitely determined by the tape pattern, if the horizontal distance between the mounting positions of these heads is determined.

Figure 3A:
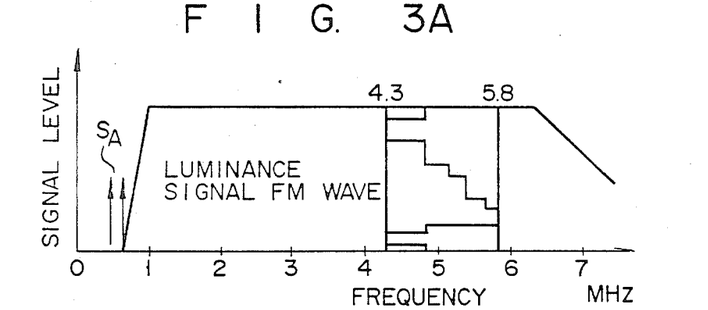
FIG. 3A shows a graph illustrating the frequency spectrum of a recording luminance signal, which is used by the recording/reproduction system according to this invention.
Figure 3B:
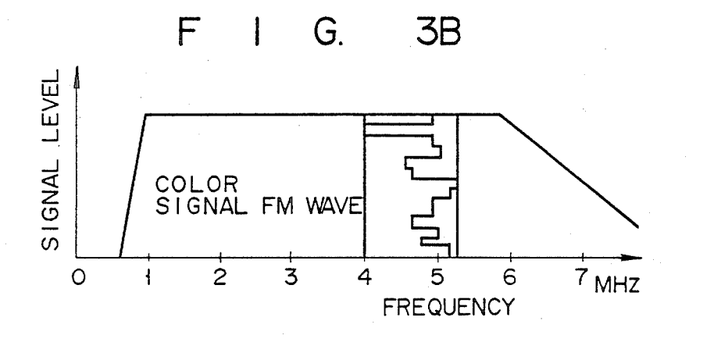
FIG. 3B shows a graph illustrating the frequency spectrum of a recording color signal, which is used by the recording/reproduction system according to this invention.
Figure 4:
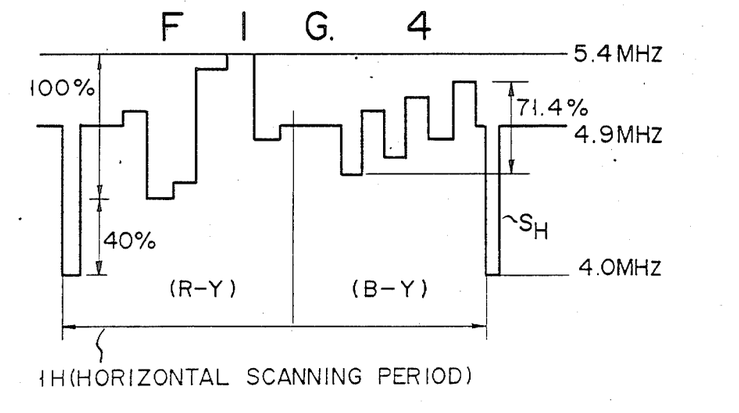
FIG. 4 shows a view showing a waveform of an example of a recording color signal, which is used by the recording/reproduction system according to this invention.

The high picture quality format allows many modulations to exist for recording the video signal in the tape. One of such modulating systems is an FM modulation as shown in FIGS. 3A and 3B. The carrier signal for the luminance signal (Y), to improve the resolution, is located in the high frequency range, 4.3 to 5.8 MH, as shown in FIG. 3A. The color signal (C) has a frequency spectrum as shown in FIG. 3B.

The timeplex system is used for recording the color signal. As shown, the R-Y and B-Y signals of the base band signal are time-compressed to ½, and these signals are time-division multiplexed with addition of sync (horizontal) signal $S_H$. The timeplex signal is frequency modulated and recorded. This timeplex system remarkably reduces the irregularity of color signal and improves the S/N performance. The sound signal may be recorded in sound track 22 on the side of the tape, as shown in FIG. 2. If necessary, for its recording, it is frequency modulated, and superposed on the luminance signal, as shown in FIG. 3A. In the figure, $S_A$ designates the carrier for the sound FM signal.

The recording system as mentioned above enables VTR to reproduce a picture quality, in which for the luminance signal, the horizontal resolution is 350 lines, S/N ratio is 46 dB or better, and for the color signal S/N ratio is 46 dB or better, which quality is as good as the broadcasted TV signal. Further, it enables VTR to reproduce the video signal in the tape as is recorded by the conventional VHS format.

Figure 5:
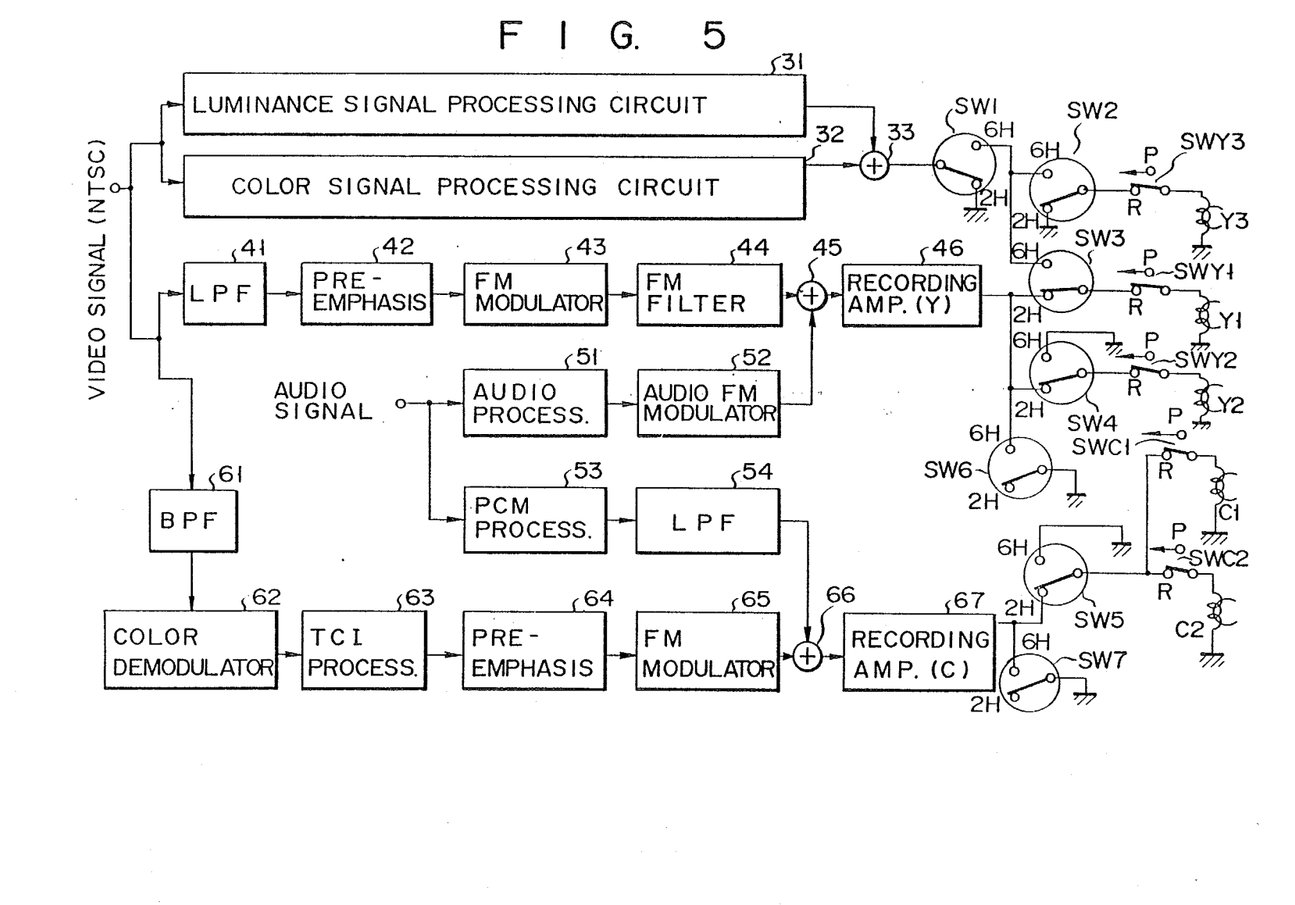
FIG. 5 shows a block diagram of a circuit arrangement of a signal recording system.

FIG. 5 shows in block form a configuration of a recording system used for the high picture quality recording system as mentioned above. As shown in the figure, when the three-time mode (6H mode) is selected, the video signal of the NTSC system is processed in the manner as in the conventional VHS home-use VTR. Specifically, the luminance signal component of the video signal is extracted and then frequency-modulated by luminance signal processing circuit 31. The video signal is applied to color signal processing circuit 32, where the color sub-carrier signal is separated from the video signal. Then, it is subjected to the low-frequency conversion. The frequency-modulated luminance signal and the low-frequency converted color sub-carrier signal are superposed in superpose circuit 33. Finally, they are recorded on the tape by heads Y1 and Y3, via mode switches SW1, SW2 and SW3 and recording/reproduction select switches SWY1 and SWY3.

On the other hand, when the fine picture quality mode (2H mode) is selected, a luminance signal component and a color signal component are separated from the video signal. In the luminance signal channel, the video signal is applied to low pass filter (LPF) 41 to separate the video luminance signal component from the video signal. The separated luminance signal component is pre-emphasized by pre-emphasis circuit 42, and it is frequency-modulated by FM modulator 43. The frequency-modulated luminance signal component is further filtered out by FM filter 44, and then supplied to superpose circuit 45. In superpose circuit 45, the luminance signal component is superposed on the audio signal which is aurally processed by audio processor 51 and frequency-modulated by audio FM modulator 52. The superposed signal is then amplified by recording amplifier 46, and supplied to heads Y1 and Y2, via mode switches SW3 and SW4 and recording/reproduction select switches SWY1 and SWY2, and is finally recorded on the tape.

In the color signal channel, the video signal is applied to band-pass filter (BPF) which in turn separates the color sub-carrier signal from the video signal. The separated color signal is demodulated by color demodulator 62, and time-compressed by time compressed integration processor (TCI processor) 63, where it is multiplexed in a timeplex manner. It is further pre-emphasized by pre-emphasis circuit 64, and then frequency modulated by FM modulator 65. The frequency modulated color signal is supplied to superpose circuit 66. In superpose circuit 66, the color signal component is, for example, superposed on the audio signal which is PCM processed by PCM processor 53 and filtered out by LPF 54. The superposed signal is amplified by recording amplifier 67. After that, it is supplied to heads C1 and C2, via mode switch SW5 and recording/reproduction select switches SWC1 and SWC2, and finally is recorded on the tape.

In the 2H mode, the output of superpose circuit 33 is grounded by mode switch SW1. In the 6H mode, the outputs of recording amplifiers 46 and 67 are respectively grounded by mode switches SW6 and SW7. These mode switches SW1 to SW7 are interlocked with each other, and switched by mode select switch, such as it installed in the VTR main unit.

Figure 6:
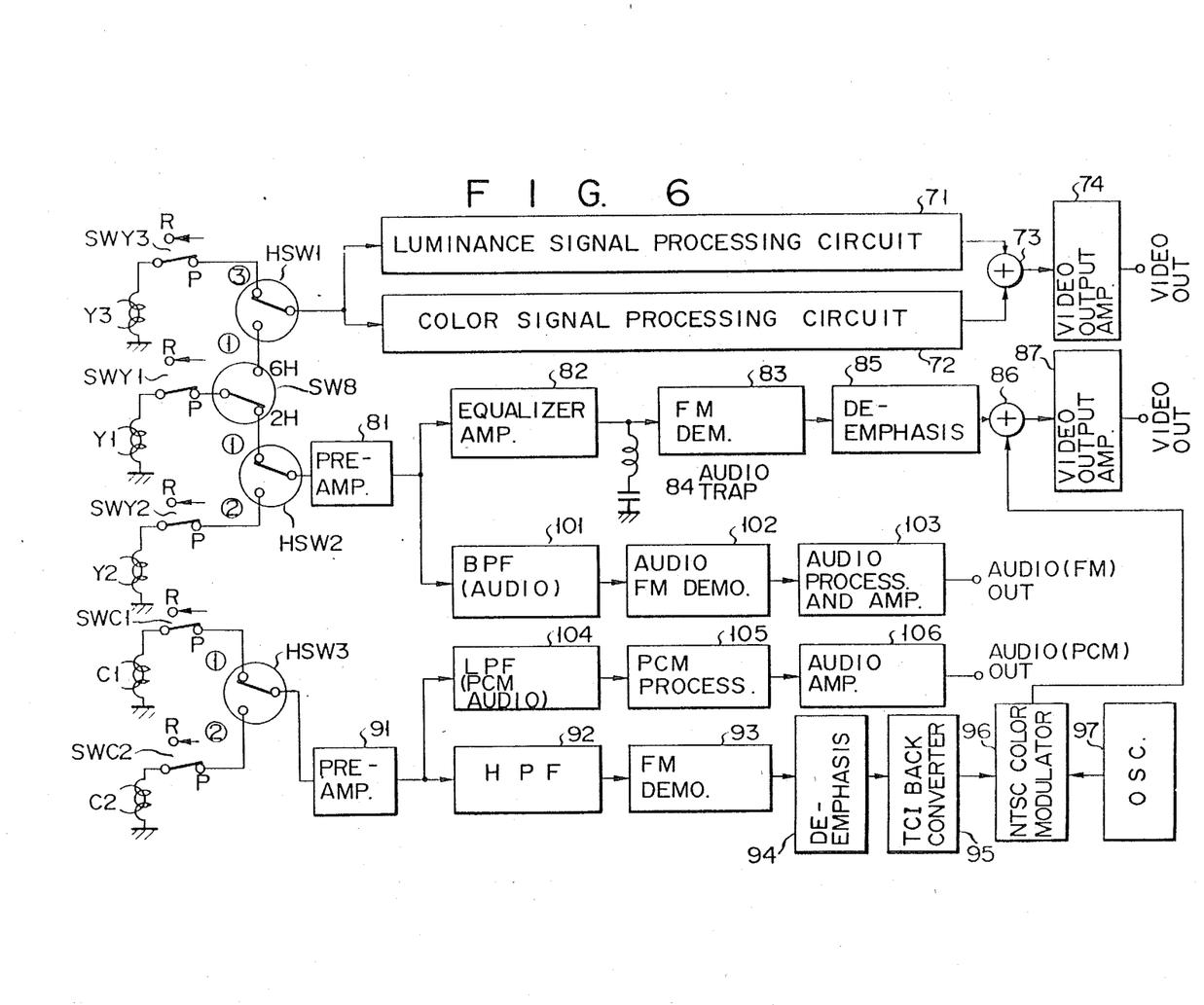
FIG. 6 shows a block diagram of a circuit arrangement of a signal reproduction system.

FIG. 6 shows a block circuit diagram of an embodiment of a circuit configuration of the reproducing system. When the three-time mode (6H mode) is selected, the video signal is processed by using heads Y1 and Y3, in the same manner as in the conventional VHS home-use VTR. The signal which has been recorded on the tape is supplied to luminance signal processing circuits 71 and color signal processing circuit 72, via recording-/reproduction select switches SWY1 and SWY3, mode switch SW8, and head switch HSW1. Head switch HSW1 selects the head now in contact with the tape of the two heads Y1 and Y3, according to the the rotation of rotary head cylinder 10. In the NTSC mode, the heads are selected alternately every 1/60 second. In the luminance signal processing circuit 71, the luminance signal is extracted, and is frequency-modulated. In the color signal processing unit 72, color signal is extracted and frequency-converted. The frequency modulated luminance signal component and frequency converted color sub-carrier signal are superposed by superpose circuit 73, and then amplified by video output amplifier 74, and output as a video signal (NTSC).

On the other hand, when fine picture quality mode (2H mode) is selected, head Y1 is connected to the luminance signal channel for the reproduction with fine picture quality by mode switch SW8. Heads Y1 and Y2 are alternately connected to luminance signal system by head switch HSW2. The luminance signal as obtained by head Y1 and Y2 is amplified by pre-amplifier 81, and then supplied to FM demodulator 83 via equalizer amplifier 82. At this time, the audio component is removed by audio trap 84. The frequency-demodulated luminance signal is de-emphasized by de-emphasis circuit 85 and supplied to superpose circuit 86.

In the color signal channel, heads C1 and C2 are alternately connected to pre-amplifier 91 by head switch HSW3. The amplified color signal is supplied to FM demodulator 93 via high pass filter 92. The frequency demodulated color signal is then de-emphasized by deemphasis circuit 94. Then, the signal which has been multiplexed in the timeplexed manner is converted back into the original component signal form by TCI back converter 95, and supplied to NTSC color modulator 96. Modulator 96 converts the color component signal into the NTSC mode color sub-carrier signal, by using the output of carrier signal oscillator 97. The converted signal is then supplied to superpose circuit 86 where it is superposed on the luminance signal, and the superposed signal is amplified by video output amplifier 74, and is output as a video signal (NTSC).

The audio signal which has been superposed on the luminance signal is extracted by band pass filter 101, and demodulated by audio FM demodulator 102. After it is processed by audio processor and amplifier 103, the signal is output as an audio signal. The audio signal which has been superposed on the color signal, is extracted by low pass filter 104, processed by PCM processor 105, and output as an audio signal via audio amplifier 106.

Figure 7:
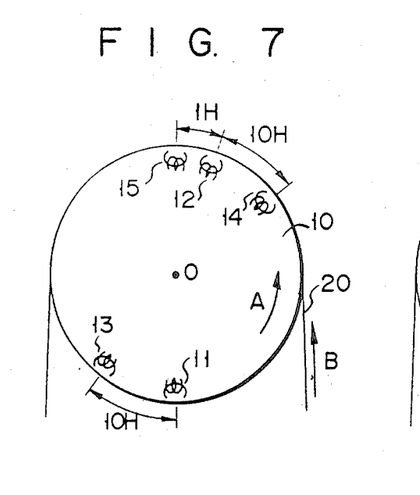
FIG. 7 shows a plan view of a first head arrangement containing the head arrangement of FIG. 1A.

FIG. 7 shows a first head arrangement including the head arrangement of FIG. 1A. As shown, a second head 12, which has a first azimuth angle, and records and reproduces the luminance signal or the color signal, is disposed at a position separate, by a distance corresponding to the period of integer times 1H (one horizontal scanning period) of the recorded video signal, from the position rotated 180° from that of first head 11 with the first azimuth angle and for recording an reproducing the luminance signal or the color signal, in the direction opposite to the rotating direction of rotary head cylinder 10. A third head 13 having a second azimuth angle different from the first azimuth angle and for recording and reproducing either the luminance or the color signal, which is different from that of the first and second heads 11 and 12, is disposed at the position separate, by the distance corresponding to the period of integer times 1H of the recorded video signal, from the position of the first head 11, in the direction opposite to the rotating direction of rotary head cylinder 10. Further, a fourth head 14 with the second azimuth angle, and for recording and reproducing either the luminance or color signal, which is different from that of the first and second heads 11 and 12, is disposed at a position separate, by the distance corresponding to the period of integer times 1H of the recorded video signal, from the position rotated 180° from that of the third head 13, in the direction opposite to the rotating direction of rotary head cylinder 10. A fifth head 15 with the second azimuth angle, is disposed at the position rotated 180° from that of the first head 11.

In the arrangement of the heads shown in FIG. 1A, the first head 11 is Y1, the second head 12 is Y2, the third head 13 is C1, the fourth head 14 is C2, and the fifth head 15 is Y3. In the first arrangement of the heads, the heads can also be allotted in the following manner.

(1) The first head 11 is Y2, the second head 12 is Y1, the third head 13 is C2, the fourth head 14 is C1 and the fifth head 15 is Y3.

(2) The first head 11 is C1, the second head 12 is C2, the third head 13 is Y1, the fourth head 14 is Y2, and the fifth head 15 is Y3.

(3) The first head 11 is C2, the second head 12 is C1, the third head 13 is Y2, the fourth head 14 is Y1, and the fifth head 15 is Y3.

Figure 8:
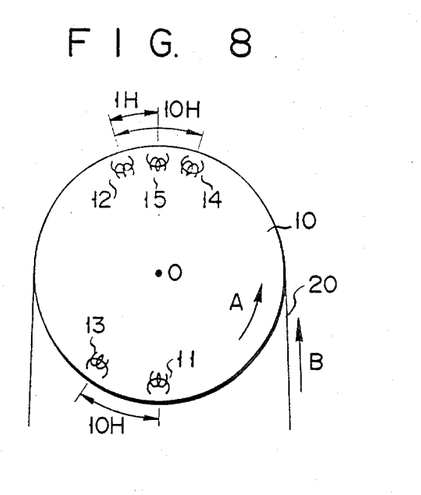
FIGS. 8 to 10 show plan views illustrating second to fourth arrangements of heads.

FIG. 8 shows a second arrangement of the heads. In the second arrangement of the heads, a second head 12 with the first azimuth angle and for recording and reproducing either the luminance or the color signal, is disposed at a position separate, by a distance corresponding to the period of integer times 1H of the recorded video signal, from the position rotated 180° from that of the first head 11 which has the first azimuth angle, and records and reproduces either the luminance signal or the color signal, in the rotating direction of rotary head cylinder 10. A third head 13 having a second azimuth angle different from that of the first and second heads 11 and 12, and for recording and reproducing either the luminance or the color signal which is different from that of the first and second heads 11 and 12, is disposed at a position separate, by the distance corresponding to the period of integer times 1H of the recorded video signal, from the position of the first head 11, in the direction opposite to the rotating direction of rotary head cylinder 10. Further, the fourth head 14 with the second azimuth angle, and for recording and reproducing either the luminance or the color signal which is different from that of the first and second heads 11 and 12, is disposed at a position separate, by the distance corresponding to the period of integer times 1H of the recorded video signal from the position rotated 180° from that of the third head 13, in the direction of the rotating direction of rotary head cylinder 10. The fifth head 15 with the second azimuth angle is disposed at a position rotated 180° from that of first head 11. In the second arrangement of the heads, the heads can be allotted in the following manner.

(1) The first head 11 is Y1, the second head 12 is Y2, the third head 13 is C1, the fourth head 14 is C2, and the fifth head 15 is Y3.

(2) The first head 11 is Y2, the second head 12 is Y1, the third head 13 is C2, the fourth head 14 is C1, and the fifth head 14 is Y3.

(3) The first head 11 is C1, the second head 12 is C2, the third head 13 is Y1, the fourth head 14 is Y2, and the fifth head 15 is Y3.

(4) The first head 11 is C2, the second head 12 is C1, the third head 13 is Y2, the fourth head 14 is Y1, and the fifth head 15 is Y3.

Figure 9:
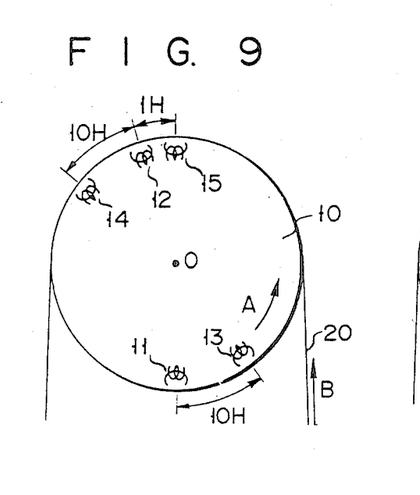

FIG. 9 shows a third head arrangement. In the third arrangement of the heads, a second head 12 having a first azimuth angle, and for recording and reproducing either the luminance or the color signal, is disposed at a position separate, by the distance corresponding to the period of integer times 1H of the recorded video signal, from the position rotated 180° from that of the first head 11 having the first azimuth angle, for recording and reproducing either the luminance signal or the color signal, in the rotating direction of rotary head cylinder 10. A third head 13 having the second azimuth angle different from the first azimuth angle, and for recording and reproducing either the luminance or the color signal which is different from that of the first and second heads 11 and 12, is disposed at a position separate, by the distance corresponding to the period of integer times 1H of the recorded video signal, from the position of the first head 11, in the rotating direction of rotary head cylinder 10. A fourth head 14 having a second azimuth angle, and for recording and producing either the luminance or the color signal which is different from that of the first and second heads 11 and 12, is disposed at a position separate, by the direction corresponding to the period of integer times 1H of the recorded video signal, from the the position rotated 180° from that of the third head 13, in the rotating direction of rotary head cylinder 10. The fifth head 15 with the second azimuth is disposed at the position rotated 180° from that of the first head 11.

In the third arrangement of the heads, the heads can be allotted in the following manner.

(1) The first head 11 is Y1, the second head 12 is Y2, the third head 13 is C1, the fourth head 14 is C2, and the fifth head 15 is Y3.

(2) The first head 11 is Y2, the second head 12 is Y1, the third head 13 is C2, the fourth head 14 is C1, and the fifth head 15 is Y3.

(3) The first head 11 is C1, the second head 12 is C2, the third head 13 is Y1, the fourth head 14 is Y2, and the fifth head 15 is Y3.

(4) The first head 11 is C2, the second head 12 is C1, the third head 13 is Y2, the fourth head 14 is Y1, and the fifth head 15 is Y3.

Figure 10:
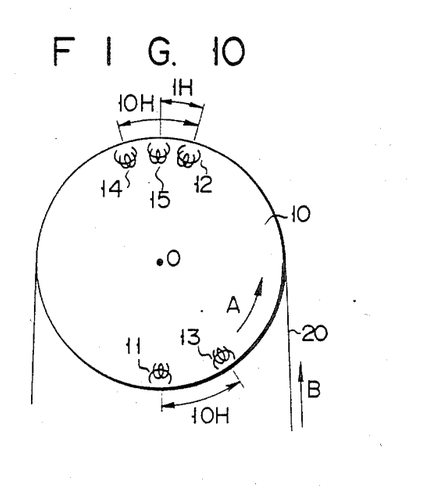

FIG. 10 shows a fourth arrangement of the heads. In the fourth arrangement of the heads, a second head 12 with the first azimuth angle, and for recording and reproducing either the luminance or the color signal, is disposed at a position separate, by a distance corresponding the period of integer times 1H of the recorded video signal, from the position rotated 180° from that of the first head 11 with the first azimuth angle and for recording and reproducing either the luminance or the color signal, in the direction opposite to the rotating direction of rotary head cylinder 10. A third head 13 having a second azimuth angle different from the first azimuth angle, and for recording and reproducing either the luminance or the color signal, which is different from the first and second heads 11 an 12, is disposed at a position separate, by a distance corresponding to the period of integer times 1H of the recorded video signal, from the position of the first head 11, in the rotating direction of rotary head cylinder 10. Further, a fourth head 14 with the second azimuth angle, and for recording and reproducing either the luminance or the color signal, which is different from that of the first and second heads 11 and 12, is disposed at a position separate, by a distance corresponding to the period of integer times 1H of the recorded video signal, from the position rotated 180° from that of the third head 13 in the direction opposite to the rotating direction of rotary head cylinder 10. A fifth head 15 with the second azimuth angle is disposed at a position rotated 180° from that of the first head 11.

In the fourth arrangement of the heads, the heads can be allotted in the following manner.

(1) The first head 11 is Y1, the second head 12 is Y2, the third head is C1, the fourth head 14 is C2, and the fifth head 15 is Y3.

(2) The first head 11 is Y2, the second head 12 is Y1, the third head 13 is C2, the fourth head 14 is C1, and the fifth head 15 is Y3.

(3) The first head 11 is C1, the second head 12 is C2, the third head 13 is Y1, the fourth head 14 is Y2, and the fifth head 15 is Y3.

(4) The first head 11 is C2, the second head 12 is C1, the third head 13 is Y2, the fourth head 14 is Y1, and the fifth head 15 is Y3.

The high picture quality recording mode as mentioned above or the conventional recording mode may be selected if an appropriate switch is used. When the high picture quality recording format is used, it is preferable to use a metal tape capable of recording the video signal at a high density, for improvement of the S/N performance. In this case, an identification mark is attached to the metal tape cassette. If so, only when detecting this mark, the high image quality recording mode is effective.

While the timeplex multiplexing system has been used for the color signal recording system in the abovementioned embodiment, it is not limited to that example. The frequency multiplexing system for the R-Y signal and the B-Y signal, for example, may be used in place of the above example. The audio FM signal may be superposed on the color signal, not the luminance signal.

Furthermore, the above description has referred to only the VHS system, but it is evident that this invention is applicable for other systems, for example, the β system.

What is claimed is:

1. A recording/reproduction system with a fine picture quality for a helical scan-type video tape recorder, comprising:

select means for selecting a recording mode or a reproduction mode;

a video signal supply source for supplying a composite video signal;

mode select means for selecting a first mode or a second mode, said first mode being provided for recording the video signal in a first recording format in which a luminance signal component and a color signal component of the video signal are recorded in different tracks, said second mode being provided for recording the video signal in a second recording format in which the frequency-modulated luminance signal and the low-frequency converted color sub-carrier signal are superposed and recorded into a single track;

first signal processing means for separating, in said first mode, the luminance signal component from the supplied video signal, and producing the separated luminance signal component;

second signal processing means for separating, in said first mode, the color signal component from the supplied composite video signal, and producing the separated color signal component;

third signal processing means for separating, in said second mode, the color sub-carrier signal and the frequency-modulated luminance signal from the supplied composite video signal, for converting the separated color sub-carrier signal into low frequencies, for superposing the separated, low-frequency converted color sub-carrier signal on the frequency-modulated luminance signal, and for producing the superposed signal;

a rotating member around which a video tape is wound in the recording mode or the reproduction mode;

first and second heads of a first azimuth angle, which are disposed on said rotating member;

third and fourth heads of a second azimuth angle different from said first azimuth angle, which are disposed on said rotating member;

a fifth head disposed on said rotating member at the position rotated 180° from said first head, and having the second azimuth angle different from that of said first head;

means for selectively supplying the signals supplied from said first to third signal processing means to said first to fifth heads according to said first and second modes in a record mode, said selectively supplying means supplying, when said first mode is selected, the output signal of either said first or said second signal processing means to said first and second heads, while at the same time supplying to said third and fourth heads the output signal of either said first or said second signal processing means, which is different from that supplied to said first and second heads, and said selectively supplying means supplying, when said second mode is selected, the output signal from said third signal processing means to said first and fifth heads;

means for selectively outputting signals supplied from said first to fifth heads according to said first and second modes in a reproduction mode, said selectively outputting means outputting, when said first mode is selected, the output signals which are alternately output from said first and second heads, as a first signal, while at the same time outputting the output signals which are alternately output from said third and fourth heads, as a second signal, and said selectively supplying means supplying, when said second mode is selected, the output signals which are alternately output from said first and fifth heads, as a third signal;

fourth signal processing means which receives said first and second signals, superposes them, and outputs the superposed signal as a video signal; and fifth signal processing means which receives said third signal, separates a luminance signal component and a low-frequency converted color sub-carrier signal from said third signal, frequency-converts the separated low-frequency converted color sub-carrier signal, superposes the frequency-converted color sub-carrier signal to the separated luminance signal component, and outputs the superposed signal as a composite video signal.

2. The system according to claim 1, wherein said second head is disposed at a position separate, by a distance corresponding to the period of integer times one horizontal scanning period of the recorded video signal, from the position of said rotating member rotated 180° from that of said first head, and said fourth head is disposed at a position separate, by a distance corresponding to the period of integer times one horizontal scanning period of the recorded video signal, from the position rotated 180° from that of said third head.

3. The system according to claim 2, wherein said second head is disposed at a position separate, by a distance corresponding to one horizontal scanning period of the recorded video signal, from the position of said rotating member rotated 180° from that of said first head, and said fourth head is disposed at a position separate, by a distance corresponding to one horizontal scanning period of the recorded video signal, from the position of said rotating member rotated 180° from that of said third head.

4. The system according to claim 3, wherein said first head and third head are disposed apart from each other by a distance corresponding to the period of integer times one horizontal scanning period of the recorded video signal, and are vertically away by a predetermined distance, and said second head and fourth head are disposed away from each other by a distance corresponding to the period of integer times one horizontal scanning period of the recorded video signal, and are vertically away by a predetermined distance.

5. The system according to claim 4, wherein said vertical distance of two heads is so selected that the luminance and the color signal will be recorded in different tracks.

6. The system according to claim 5, wherein said first head and third head are disposed away from each other by a distance corresponding to the period of ten times one horizontal scanning period of the recorded video signal, and said second head and fourth head is disposed away from each other by a distance corresponding to the period of ten times one horizontal scanning period of the recorded video signal.

7. The system according to claim 1, wherein said first signal processing means frequency-modulates said luminance signal component and outputs the FM-modulated signal, said second signal processing means frequency-modulates said color signal component and outputs the FM-modulated signal, and said third signal processing means frequency-modulates said luminance signal, and superposes said low-frequency converted color sub-carrier signal on the frequency-modulated luminance signal, and outputs the superposed signal.

8. The system according to claim 7, wherein said fourth signal processing means frequency-demodulates the luminance signal component and the color signal component, and then superposes them.

9. The system according to claim 1, wherein said second signal processing means time-compresses the R-Y and B-Y signals of the base band signal to ½, time-division multiplexes the time-compressed signals with addition of sync signal, frequency-modulates the multiplex signal, and outputs that modulated signal as said color signal component.

10. The system according to claim 1, wherein said second mode is the three-time mode of the VHS format.

11. The system according to claim 10, wherein said first format employs the pitch of a track equal to that of one track in standard mode of said VHS format, for the tracks for the luminance signal and the color signal.

12. A recording system with a fine picture quality for a helical scan-type video tape recorder comprising:
a video signal supply source for supplying a composite video signal;
mode select means for selecting a first mode or a second mode, said first mode being provided for recording the video signal in a first recording format in which a luminance signal component and a color signal component of the video signal are recorded in different tracks, said second mode being provided for recording the video signal in a second recording format in which the frequency-modulated luminance signal and the low-frequency converted color sub-carrier signal are superposed and recorded into a single track;
first signal processing means for separating, in said first mode, the luminance signal component from the supplied composite video signal, and producing the separated luminance signal component;
second signal processing means for separating, in said first mode, the color signal component from the supplied composite video signal, and producing the separated color signal component;
third signal processing means for separating, in said second mode, the color sub-carrier signal and the luminance signal component from the supplied composite video signal, for converting the separated color sub-carrier signal into low frequencies, for superposing the separated, low-frequency converted color sub-carrier signal on the frequency-modulated luminance signal, and for producing the superposed signal;
a rotating member around which a video tape is wound;
first and second heads of a first azimuth angle, which are disposed on said rotating member;
third and fourth heads of a second azimuth angle different from said first azimuth angle, which are disposed on said rotating member;
a fifth head disposed on said rotating member at the position rotated 180° from said first head, and having the second azimuth angle different from that of said first head; and
means for selectively supplying the signals supplied from said first to third signal processing means to said first to fifth heads according to said first and second modes, said selectively supplying means supplying, when said first mode is selected, the output signal of either said first or said second signal processing means to said first and second heads, while at the same time supplying to said third and fourth heads the output signal of either said first or said second signal processing means, which is different from that supplied to said first and second heads, and said selectively supplying means supplying, when said second mode is selected, the output signal from said third signal processing means to said first and fifth heads.

13. The system according to claim 12, wherein said second head is disposed at a position separate, by a distance corresponding to the period of integer times one horizontal scanning period of the recorded video signal, from the position of said rotating member rotated 180° from that of said first head, and said fourth head is disposed at a position separate, by a distance corresponding to the period of integer times one horizontal scanning period of the recorded video signal, from the position rotated 180° from that of said third head.

14. The system according to claim 13, wherein said second head is disposed at a position separate, by a distance corresponding to one horizontal scanning period of the recorded video signal, from the position of said rotating member rotated 180° from that of said first head, and said fourth head is disposed at a position separate, by a distance corresponding to one horizontal scanning period of the recorded video signal, from the position of said rotating member rotated 180° from that of said third head.

15. The system according to claim 14, wherein said first head and third head are disposed away from each other by a distance corresponding to the period of integer times one horizontal scanning period of the recorded video signal, and are vertically away by a predetermined distance, and said second head and fourth head are disposed away from each other by a distance corresponding to the period of integer times one horizontal scanning period of the recorded video signal, and are vertically away by a predetermined distance.

16. The system according to claim 15, wherein said vertical distance of two heads is so selected that the luminance and the color signal will be recorded in different tracks.

17. The system according to claim 16, wherein said first head and third head are disposed away from each other by a distance corresponding to the period of ten times one horizontal scanning period of the recorded video signal, and said second head and fourth head is disposed away from each other by a distance corresponding to the period of ten times one horizontal scanning period of the recorded video signal.

18. The system according to claim 12, wherein said second mode is the three-time mode of the VHS format.

19. The system according to claim 18, wherein said first format employs the pitch of a track equal to that of one track in standard mode of said VHS format, for the tracks for the luminance signal and the color signal.

20. The system according to claim 12, wherein said first signal processing means frequency-modulates said luminance signal component and outputs the FM-modulated signal, said second signal processing means frequency-modulates said color signal component and outputs the FM-modulated signal, and said third signal processing means frequency-modulates said luminance signal, and superposes said low-frequency converted color sub-carrier signal on the frequency-modulated luminance signal, and outputs the superposed signal.

21. The system according to claim 20, wherein said second signal processing means time-compresses both the R-Y and B-Y signals of the base band signal to ½, time-division multiplexes the time-compressed signals with addition of sync signal, frequency-modulates the multiplex signal, and outputs that modulated signal as said color signal component.

22. A reproduction system with a fine picture quality for a helical scan-type video tape recorder comprising:
mode select means for selecting a first mode or a second mode, said first mode being provided for recording a video signal in a first recording format in which a luminance signal component and a color signal component of the video signal are recorded in different tracks, said second mode being provided for recording the video signal in a second recording format in which the frequency-modulated luminance signal and the low-frequency converted color sub-carrier signal are superposed and recorded into a single track;
a rotating member around which a video tape is wound;
first and second heads of a first azimuth angle and for reproducing either of said luminance signal component or said color signal component, said first and second heads being disposed on said rotating member;
third and fourth heads of a second azimuth angle different from said first azimuth angle, and for reproducing either of said luminance signal component or said color signal component, which is different from that of said first and second heads, said third and fourth heads being disposed on said rotating member;
a fifth head disposed on said rotating member at the position rotated 180° from said first head, and having the second azimuth angle different from that of said first head, the signal as recorded in said second format being reproduced in cooperation with said fifth head and said first head;
means for selectively outputting the signals supplied from said first to fifth heads according to said first and second modes, said selectively outputting means outputting, when said first mode is selected, the signals which are alternately output from said first and second heads as a first signal, while at the same time outputting the signals which are alternately output from said third and fourth heads as a second signal, and said selectively outputting means outputting, when said second mode is selected, the signals which are alternately output from said first and fifth heads as a third signal;
first signal processing means which receives said first and second signals, superposes them, and outputs the superposed signal as a video signal; and
second signal processing means which receives said third signal, separates a luminance signal and a low-frequency converted color sub-carrier signal from said third signal, frequency-converts the separated low-frequency converted color sub-carrier signal, superposes the frequency-converted color sub-carrier signal to the separated luminance signal, and outputs the superposed signal as a composite video signal.

23. The system according to claim 22, wherein said second head is disposed at a position separate, by a distance corresponding to the period of integer times one horizontal scanning period of the recorded video signal, from the position of said rotating member rotated 180° from that of said first head, and said fourth head is disposed at a position separate, by a distance corresponding to the period of integer times one horizontal scanning period of the recorded video signal, from the position rotated 180° from that of said third head.

24. The system according to claim 23, wherein said second head is disposed at a position separate, by a distance corresponding to one horizontal scanning period of the recorded video signal, from the position of said rotating member rotated 180° from that of said first head, and said fourth head is disposed at a position separate, by a distance corresponding to one horizontal scanning period of the recorded video signal, from the position of said rotating member rotated 180° from that of said third head.

25. The system according to claim 24, wherein said first head and third head are disposed away from each other by a distance corresponding to the period of integer times one horizontal scanning period of the recorded video signal, and are vertically away by a predetermined distance, and said second head and fourth head are disposed away from each other by a distance corresponding to the period of integer times one horizontal scanning period of the recorded video signal, and are vertically away by a predetermined distance.

26. The system according to claim 25, wherein said vertical distance of two heads is so selected that the luminance and the color signal will be recorded in different tracks.

27. The system according to claim 26, wherein said first head and third head are disposed away from each other by a distance corresponding to the period of ten times one horizontal scanning period of the recorded video signal, and said second head and fourth head is disposed away from each other by a distance corresponding to the period of ten times one horizontal scanning period of the recorded video signal.

28. The system according to claim 22, wherein said second mode is the three-time mode of the VHS format.

29. The system according to claim 28, wherein said first format employs the pitch of a track equal to that of one track in standard mode of said VHS format, for the tracks for the luminance signal and the color signal.

30. The system according to claim 22, wherein said first signal processing means frequency-demodulates the luminance signal component and the color signal component, and superposes them.

31. A recording/reproduction head device with a fine picture quality for a helical scan-type video tape recorder of the type in which the luminance and the color signals are recorded into the different tracks by the heads having different azimuth angles, comprising:
a rotating member around which a video tape is wound;
first and second heads of a first azimuth angle, for recording on said video tape either the luminance or the color signal, and for reproducing the video tape thus recorded, said first and second heads being disposed on said rotating member;

third and fourth heads of a second azimuth angle, for recording either the luminance or the color signal, which is different from that of said first and second heads, and for reproducing the video tape thus recorded, said third and fourth heads being disposed on said rotating member;

a fifth head disposed on said rotating member at the position rotated 180° from that of said first head, and having the second azimuth angle different from that of said first head, the frequency-modulated luminance signal and the low-frequency converted color sub-carrier signal being superposed and recorded in one track of the video tape by said first head oppositely disposed to said fifth head, and video tape thus recorded being reproduced in cooperation with said fifth head and said first head.

32. The device according to claim 31, wherein said second head is disposed at a position separate, by a distance corresponding to the period of integer times one horizontal scanning period of the recorded video signal, from the position of said rotating member rotated 180° from that of said first head, and said fourth head is disposed at a position separate, by a distance corresponding to the period of integer times one horizontal scanning period of the recorded video signal, from the position rotated 180° from that of said third head.

33. The device according to claim 32, wherein said second head is disposed at a position separate, by a distance corresponding to one horizontal scanning period of the recorded video signal, from the position of said rotating member rotated 180° from that of said first head, and said fourth head is disposed at a position separate, by a distance corresponding to one horizontal scanning period of the recorded video signal, from the position of said rotating member rotated 180° from that of said third head.

34. The device according to claim 33, wherein said second head is disposed at a position separate, by a distance corresponding to one horizontal scanning period of the recorded video signal, from the position of said rotating member rotated 180° from that of said first head, in the rotating direction of said rotating member, and said fourth head is disposed at a position separate, by a distance corresponding to one horizontal scanning period, from the position of said rotating member of said rotating member rotated 180° from that of said third head, in the rotating direction of said rotating member.

35. The device according to claim 33, wherein said second head is disposed at a position separate, by a distance corresponding to one horizontal scanning period of the recorded video signal, in the direction opposite to the rotating direction of said rotating member, from the position of said rotating member rotated 180° from that of said first head, and said fourth head is disposed at a position separate, by a distance corresponding to one horizontal scanning period of the recorded video signal, in the direction opposite to the rotating direction of said rotating member, from the position of said rotating member rotated 180° from that of said third head.

36. The device according to claim 34, wherein said first head and third head are disposed away from each other by a distance corresponding to the period of integer times one horizontal scanning period of the recorded video signal, and are vertically away by a predetermined distance, and said second head and fourth head are disposed away from each other by a distance corresponding to the period of integer times one horizontal scanning period of the recorded video signal, and are vertically away by a predetermined distance.

37. The device according to claim 36, wherein said first head and third head are disposed away from each other by a distance corresponding to the period of ten times one horizontal scanning period of the recorded video signal, and said second head and fourth head is disposed away from each other by a distance corresponding to the period of ten times one horizontal scanning period of the recorded video signal.

38. The device according to claim 37, wherein said third head is disposed separate, by a distance corresponding to the period of ten times one horizontal scanning period of the recorded video signal, from the position of said first head, in the rotating direction of said rotating member, and said fourth head is disposed separate, by a distance corresponding to the period of ten times one horizontal scanning period of the recorded video signal, from the position of said second head, in the rotating direction of said rotating member.

39. The device according to claim 37, wherein said third head is disposed separate, by a distance corresponding to the period of ten times one horizontal scanning period of the recorded video signal, from the position of said first head, in the direction opposite to the rotating direction of said rotating member, and said fourth head are disposed separate, by a distance corresponding to the period of ten times one horizontal scanning period of the recorded video signal, from the position of said second head, in the direction opposite to the rotating direction of said rotating member.

40. The device according to claim 36, wherein said vertical distance of two heads is so selected that the luminance and the color signal will be recorded in different tracks.

41. The device according to claim 35, wherein said first head and third head are away from each other, by a distance corresponding to the period of integer times one horizontal scanning period of the recorded video signal, and are vertically away by a predetermined distance, and said second head and fourth head are away from each other, by a distance corresponding to the period of integer times one horizontal scanning period of the recorded video signal, and are vertically away by a predetermined distance.

42. The device according to claim 41, wherein said first head and third head are disposed away from each other by a distance corresponding to the period of ten times one horizontal scanning period of the recorded video signal, and said second head and fourth head are disposed away from each other by a distance corresponding to the period of ten times one horizontal scanning period of the recorded video signal.

43. The device according to claim 42, wherein said third head is disposed at a position separate, by a distance corresponding to the period of ten times one horizontal scanning period of the recorded video signal, in the rotating direction of said rotating member, from the position of said first head, and said fourth head is disposed at a position separate, by a distance corresponding to the period of ten times one horizontal scanning period of the recorded video signal, in the direction of the rotating direction of said rotating member, from the position of said second head.

44. The device according to claim 42, wherein said third head is disposed at a position separate, by a distance corresponding to the period of ten times one horizontal scanning period of the recorded video signal, in the direction opposite to the rotating direction of said rotating member, from the position of said first head, and said fourth head are disposed at a position separate, by a distance corresponding to the period of ten times one horizontal scanning period of the recorded video signal, in the direction opposite to the rotating direction of said rotating member, from the position of said second head.

45. The device according to claim 41, wherein above-mentioned vertical distance of two heads is so selected that the luminance and the color signal will be recorded in different tracks.

46. The device according to claim 31, wherein said second mode is the three-time mode of the VHS format.

47. The device according to claim 46, wherein said first format employs the pitch of a track equal to that of one track in standard mode of said VHS format, for the tracks for the luminance signal and the color signal.

* * * * *